United States Patent
Hsieh et al.

(10) Patent No.: US 10,394,080 B2
(45) Date of Patent: Aug. 27, 2019

(54) WIDEBAND COMPENSATION STACK FILM AND OPTICAL ELEMENT USING THE SAME

(71) Applicant: INDUSTRIAL TECHNOLOGY RESEARCH INSTITUTE, Hsinchu (TW)

(72) Inventors: Pao-Ju Hsieh, Zhudong Township (TW); Mei-Chih Peng, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 82 days.

(21) Appl. No.: 15/857,152

(22) Filed: Dec. 28, 2017

(65) Prior Publication Data

US 2019/0204687 A1    Jul. 4, 2019

(51) Int. Cl.
*G02F 1/13363* (2006.01)
*G02F 1/1335* (2006.01)
*G02B 5/30* (2006.01)

(52) U.S. Cl.
CPC ..... *G02F 1/133636* (2013.01); *G02B 5/3025* (2013.01); *G02B 5/3083* (2013.01); *G02F 1/13363* (2013.01); *G02F 1/133528* (2013.01)

(58) Field of Classification Search
CPC .......... G02F 1/133636; G02F 1/13363; G02F 1/133528; G02B 5/3083; G02B 5/3025
See application file for complete search history.

(56) References Cited

U.S. PATENT DOCUMENTS

| | | | |
|---|---|---|---|
| 5,381,253 A * | 1/1995 | Sharp | G02F 1/13471 349/116 |
| 5,870,159 A * | 2/1999 | Sharp | G02F 1/0136 349/117 |
| 6,025,958 A | 2/2000 | Yamaoka et al. | |
| 6,380,997 B1 * | 4/2002 | Sharp | C09K 19/0225 252/299.01 |
| 7,169,447 B2 | 1/2007 | Su Yu et al. | |
| 8,339,566 B2 * | 12/2012 | Escuti | G02B 5/3016 349/187 |
| 9,298,041 B2 | 3/2016 | Escuti et al. | |
| 9,459,389 B2 | 10/2016 | Shimizu et al. | |
| 9,500,790 B2 | 11/2016 | Fujisawa et al. | |
| 2005/0213023 A1 * | 9/2005 | Kashima | G02B 5/3016 349/194 |

(Continued)

FOREIGN PATENT DOCUMENTS

| | | |
|---|---|---|
| CN | 101339322 B | 6/2012 |
| JP | 2007-501437 A | 1/2007 |

(Continued)

*Primary Examiner* — Jia X Pan
(74) *Attorney, Agent, or Firm* — Birch, Stewart, Kolasch & Birch, LLP

(57) ABSTRACT

A wideband compensation stack film comprises a chiral-half-wave compensation film and a chiral-quarter-wave compensation film. The chiral-quarter-wave compensation film is directly in contact with the chiral half-wave compensation film. Along the contact surface, the first layer liquid crystal molecule of the chiral-quarter-wave compensation film is arranged in the last layer of liquid crystal molecule of the chiral-half-wave compensation film. The retardation values (R) and the optical axis (Z) of the stack films follow a linear relationship: R=aZ+b.

13 Claims, 13 Drawing Sheets

(56) References Cited

U.S. PATENT DOCUMENTS

| | | |
|---|---|---|
| 2006/0125985 A1 | 6/2006 | Chen |
| 2012/0098422 A1* | 4/2012 | Jung .................. H01L 51/5281 313/512 |
| 2012/0120354 A1* | 5/2012 | Kitson .............. G02F 1/133553 349/115 |
| 2013/0027656 A1* | 1/2013 | Escuti ................. G02B 5/3083 349/193 |
| 2015/0378075 A1* | 12/2015 | Gam ................... G02B 5/3016 349/194 |
| 2016/0033698 A1* | 2/2016 | Escuti ................. G02B 5/3016 349/186 |
| 2017/0219818 A1 | 8/2017 | Fang et al. |

FOREIGN PATENT DOCUMENTS

| | | |
|---|---|---|
| JP | 2011-508281 A | 3/2011 |
| TW | 584765 B | 4/2004 |
| TW | 200719010 A | 5/2007 |
| TW | I284218 B | 7/2007 |
| TW | I284236 B | 7/2007 |
| TW | I340260 B | 4/2011 |
| TW | 201224609 A1 | 6/2012 |
| TW | I519832 B | 2/2016 |
| TW | I569054 B | 2/2017 |
| TW | I580995 B | 5/2017 |

* cited by examiner

WIDEBAND COMPENSATION STACK FILM AND OPTICAL ELEMENT USING THE SAME

TECHNICAL FIELD

The disclosure relates in general to a wideband compensation stacked layer and an optical element using the same, and more particularly to a wideband compensation stacked layer with a chiral compensation film and an optical element using the same.

BACKGROUND

A conventional circular polarizer is formed of a linear polarizer and a quarter-wave compensation film. The linear polarizer and the quarter-wave compensation film are stacked together at an angle of 45°. The quarter-wave compensation film is able to convert a linearly polarized light into a circularly polarized light. However, the quarter-wave compensation film is usually a narrowband phase retarder. That is, only at a specific spectrum a perfect circular polarization conversion can be achieved. Thereafter, it is hard to allow all the visible range of light, 400 to 700 nanometer (nm), to be converted to the polar point, the arctic, or an arctic region by using such a narrow-band quarter-wave compensation film, as a Poincare sphere optics was adopted.

Therefore, wideband compensation films are preferred for a favorable circular polarization conversion. There are two ways to manufacture the wideband compensation films, for example, a single-film type and a two-film type. It is known the single-film type requires very special material design, and the target retardation adjustment needs lots of work. The two-film type is more prevalent by simply stacking a half-wave compensation film and a quarter-wave compensation film and laminating together. However, particularly precise orientation is required for those compensation films in the two-film type, which means material waste and a large amount of labor cannot be avoided. Moreover, considering a mainstream requirement, thickness becomes a large issue either with a single-film type or a two-film type. Therefore, it has become a breakthrough requirement for the industries to provide a very thin wideband compensation stacked layer capable of covering the entire range of the visible light and is easy to manufacture.

SUMMARY

According to one embodiment, a wideband compensation stacked layer including a chiral-half-wave compensation film and a chiral-quarter-wave compensation film is provided. The chiral-quarter-wave compensation film is directly in contact with the chiral half-wave compensation film through a first contact surface. Along the first contact surface, the first layer of liquid crystal molecules of the chiral-quarter-wave compensation film is arranged in line with the last layer of liquid crystal molecules of the chiral-half-wave compensation film. The retardation value (R) of the wideband compensation stacked layer and the equivalent optical axis (Z) of the wideband compensation stacked layer with respect to the optical axis of a linear polarizing film follow a linear relationship: $R=aZ+b$, wherein $a$ and $b$ are constant coefficients.

According to another embodiment, an optical element is provided. The optical element includes a wideband compensation stacked layer, a function layer and an adhesive layer, wherein the adhesive layer is interposed between the chiral-quarter-wave compensation film and the function layer for adhering the chiral-quarter-wave compensation film and the function layer.

The above and other aspects of the disclosure will become better understood with regard to the following detailed description of the preferred but non-limiting embodiment(s). The following description is made with reference to the accompanying drawings.

Figure 1:
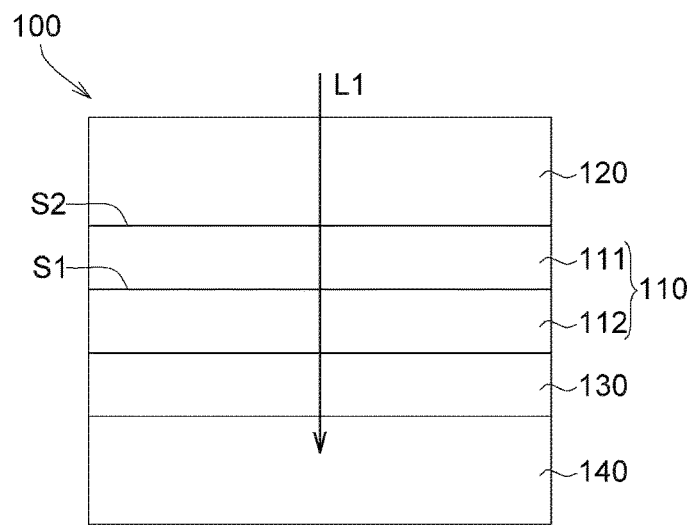
FIG. 1 is a cross-sectional view of an optical element according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2A:
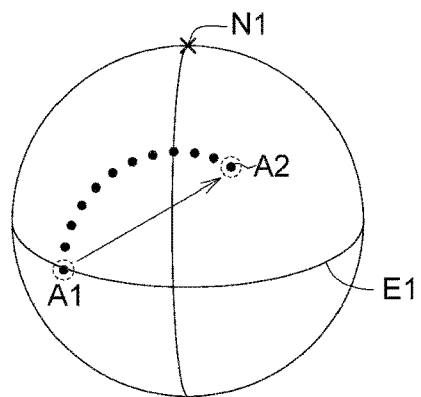
FIG. 2A is an optical path of the chiral-half-wave compensation film of FIG. 1 on a Poincare sphere.
Figure 2B:
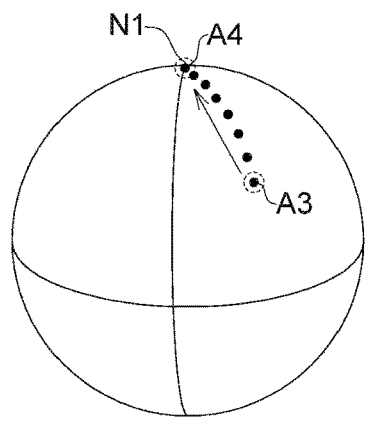
FIG. 2B is a continued optical path of the chiral-quarter-wave compensation film after the chiral-half-wave compensation film of FIG. 1 on a Poincare sphere.

Referring to FIG. 1 and FIGS. 2A and 2B. FIG. 1 is a cross-sectional view of an optical element 100 according to an embodiment of the present disclosure. FIG. 2A is an optical path of the chiral-half-wave compensation film 111 of FIG. 1 on a Poincare sphere. FIG. 2B is the optical path of the chiral-quarter-wave compensation film 112 of FIG. 1 following the optical path of the chiral-half-wave compensation film on a Poincare sphere.

As indicated in FIG. 1, the optical element 100 includes a wideband compensation stacked layer 110, a linear polarizing film 120, an adhesive layer 130 and a function layer 140 arranged in a bottom-up order, wherein the adhesive layer 130 is interposed between the wideband compensation stacked layer 110 and the function layer 140 for adhering the wideband compensation stacked layer 110 and the function layer 140. In the present embodiment, the function layer 140 is exemplified by a light-emitting diode layer 140, but the embodiments of the present disclosure are not limited thereto. Besides, the wideband compensation stacked layer 110 and the linear polarizing film 120 can also form another wideband circular polarizer; the wideband compensation stacked layer 110 and the linear polarizing film 120 can also include an adhesive layer.

The wideband compensation stacked layer 110 includes a chiral-half-wave compensation film 111 and a chiral-quarter-wave compensation film 112. Although it is not illustrated in the diagram, the chiral-half-wave compensation film 111 includes a first chiral material and a first liquid crystal molecule, wherein the first chiral material makes the first liquid crystal molecule rotate, such that the chiral-half-wave compensation film 111 can rotate the light. Although it is not illustrated in the diagram, the chiral-quarter-wave compensation film 112 includes a second chiral material and a second liquid crystal molecule, wherein the second chiral material makes the second liquid crystal molecule rotate, such that the chiral-quarter-wave compensation film 112 can rotate the light.

The chiral-quarter-wave compensation film 112 is directly in contact with the chiral-half-wave compensation film 111 through a first contact surface S1. Along the first contact surface S1, the first layer of liquid crystal molecules of the chiral-quarter-wave compensation film 112 is arranged in line with the last layer of liquid crystal molecules of the chiral-half-wave compensation film 111, such that no off-axis angle is formed between the first layer of liquid crystal molecules and the last layer of liquid crystal molecules.

The chiral-half-wave compensation film 111 is interposed between the linear polarizing film 120 and the chiral-quarter-wave compensation film 112. The ambient light L1 sequentially passes through the linear polarizing film 120, the chiral-half-wave compensation film 111 and the chiral-quarter-wave compensation film 112. The adhesive layer 130 is exemplified by a translucent adhesive layer through which the light L1 can enter the function layer 140.

In FIG. 2A, the change in the polarization state is explained using the trajectory on the Poincare sphere, wherein point A1 denotes a linearly polarized light converted from the ambient light L1 passing through the linear polarizing film 120; point A2 denotes the polarization state of the light L1 passing through the last layer of liquid crystal molecules of the chiral-half-wave compensation film 111. In FIG. 2B, point A3 denotes the polarization state of the light L1 on the first layer of liquid crystal molecules of the chiral-quarter-wave compensation film 112; point A4 denotes a circularly polarized light converted from the light L1 passing through the last layer of liquid crystal molecules of the chiral-quarter-wave compensation film 112. The closer to the polar point N1 (such as the North pole or the south pole of the Poincare sphere) the polarization state is, the closer to the circularly polarized light the polarized light will be. When the polarization state is on the equator E1 of the Poincare sphere, this implies that the light is a linearly polarized light. When the polarization state is between the polar point N1 and the equator E1, this implies that the light is an elliptically polarized light. Thus, if the endpoints from different wavelengths converted by the compensation film dispersed within a small region near the polar region of the Poincare sphere, the compensation film can be regarded as a wideband compensation film capable of converting the linearly polarized light into a circularly polarized light.

Refer to FIGS. 2A and 2B. Since the first layer of liquid crystal molecules of the chiral-quarter-wave compensation film 112 is arranged in line with the last layer of liquid crystal molecules of the chiral-half-wave compensation film 111, point A2 and point A3 substantially overlap each other, and the change in phase compensation is continuous on the first contact surface S1.

As indicated in FIG. 1, the chiral-half-wave compensation film 111 is either directly or indirectly in contact with the linear polarizing film 120 through a second contact surface S2; along the second contact surface S2, the first layer of liquid crystal molecules of the chiral-half-wave compensation film 111 is arranged in line with the optical axis of the linear polarizing film 120, such that no off-axis angle is formed between the first layer of liquid crystal molecules of the chiral-half-wave compensation film 111 and the optical axis of the linear polarizing film 120. As indicated in FIG. 2A, the polarization state of the light L1 emitted from the linear polarizing film 120 substantially overlaps the polarization state of the light L1 incident to the first layer of liquid crystal molecules of the chiral-half-wave compensation film 111 at point A1.

The chiral-half-wave compensation film 111 has at least one of the following features: (1) Before a first chiral material is added to the chiral-half-wave compensation film 111, the chiral-half-wave compensation film 111 generates an original retardation value within a range of 225 nm to 325 nm, preferably about 240 nm to 300 nm, for an incident light with a wavelength of 550 nm; (2) After the first chiral material is added to the chiral-half-wave compensation film 111, the angle difference between the first layer of liquid crystal molecules of the chiral-half-wave compensation film 111 and the last layer of liquid crystal molecules is within a range of about 15° to 35°, preferably about 20° to 30°; (3) After the first chiral material is added to the chiral-half-wave compensation film 111, individual equivalent optical axis of the chiral-half-wave compensation film 111 forms angle within a range of about 5° to 30°, preferably about 5° to 20°, with respect to the optical axis of the linear polarizing film 120; (4) After the first chiral material is added to the chiral-half-wave compensation film 111, the retardation value of the first liquid crystal molecule of the chiral-half-wave compensation film 111 is within a range of about 230 nm to 270 nm.

The chiral-quarter-wave compensation film 112 has at least one of the following features: (1) Before a second chiral material is added to the chiral-quarter-wave compensation film 112, the chiral-quarter-wave compensation film 112 generates an original retardation value within a range of about 112 nm to 163 nm, preferably about 120 nm to 150 nm, for an incident light with a wavelength of 550 nm; (2) After the second chiral material is added to the chiral-quarter-wave compensation film 112, the angle difference between the first layer of liquid crystal molecules of the chiral-quarter-wave compensation film 112 and the last layer of liquid crystal molecules of the chiral-quarter-wave compensation film 112 is within a range of 70° to 95°, preferably about 75° to 90°; (3) After the second chiral material is added to the chiral-quarter-wave compensation film 112, individual equivalent optical axis of chiral-quarter-wave compensation film 112 forms an angle within a range of about 25° to 50°, preferably about 30° to 50°, with respect to the optical axis of the linear polarizing film 120; (4) After the second chiral material is added to the chiral-quarter-wave compensation film 112, the retardation value of the second liquid crystal molecule of the chiral-quarter-wave compensation film 112 is within a range of about 75 nm to 110 nm.

The wideband compensation stacked layer 110 of the present disclosure has at least one of the following features: (1) For an incident light with a wavelength of 550 nm, the retardation value of stacked layer is within a range of about 160 nm to 210 nm, preferably about 170 nm to 190 nm; (2) The equivalent optical axis forms an angle within a range of about 0° to 15°, preferably about 3° to 9°, with respect to the optical axis of the linear polarizing film 120; (3) The retardation value (R) of the stacked layer and the equivalent optical axis (Z) of the stacked layer with respect to the optical axis of the linear polarizing film 120 follow a linear relationship: R=aZ+b, wherein R denotes the retardation value of the stacked layer; Z denotes the equivalent optical axis of the stacked layer with respect to the optical axis of a linear polarizing film, a and b are constant coefficients. The values of coefficients a and b are determined according to the slope of the line segment, and are not limited in the embodiments of the present disclosure.

In an embodiment, the rotation angle of the first liquid crystal molecule of the chiral-half-wave compensation film 111 is smaller than that of the second liquid crystal molecule of the chiral-quarter-wave compensation film 112. Detailed descriptions are disclosed below.

Figure 3A:
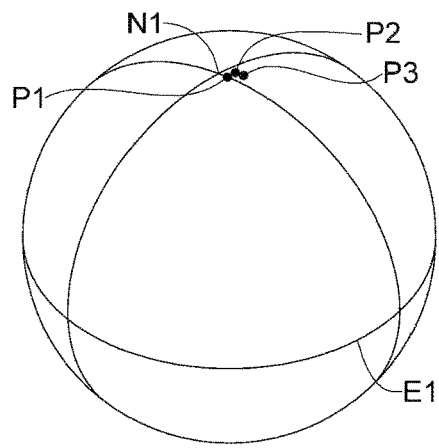
FIG. 3A is a graph showing the simulation results of the circular polarization converting dispersion of the wideband compensation stacked layer of FIG. 1, at 450 nm, 550 nm and 650 nm.
Figure 3B:
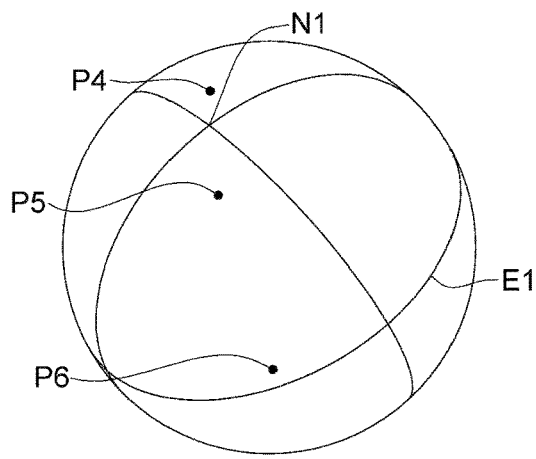
FIG. 3B is a graph showing the simulation results of the circular polarization converting dispersion of the wideband compensation stacked layer according to a first comparison example, at 450 nm, 550 nm and 650 nm.
Figure 3C:
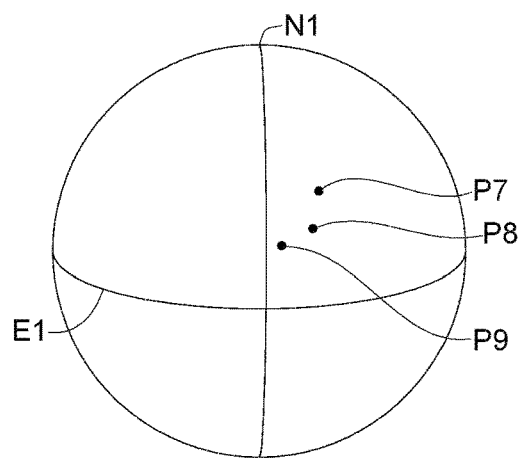
FIG. 3C is a graph showing the simulation results of the circular polarization converting dispersion of the wideband compensation stacked layer according to a second comparison example, at 450 nm, 550 nm and 650 nm.

As indicated in FIGS. 3A to 3C. FIG. 3A is a graph showing the simulation results of the circular polarization converting dispersion of the wideband compensation stacked layer of FIG. 1, at 450 nm, 550 nm and 650 nm. FIG. 3B is a graph showing the simulation results of the circular polarization converting dispersion of the wideband compensation stacked layer according to a first comparison example, at 450 nm, 550 nm and 650 nm. FIG. 3C is a graph showing the simulation results of the circular polarization converting dispersion of the wideband compensation stacked layer according to a second comparison example, at 450 nm, 550 nm and 650 nm.

Points P1 to P3 of FIG. 3A denote the final trajectory points converted from the light with wavelengths of 450 nm, 550 nm and 650 nm, and so do points P4 to P6 of FIG. 3B and points P7 to P9 of FIG. 3C denote the final trajectory points converted from the light with wavelengths of 450 nm, 550 nm and 650 nm.

Let the angle difference between the first layer of liquid crystal molecules and the last layer of liquid crystal molecules of the chiral-half-wave compensation film 111 be set as 24°, and the angle difference between the first layer of liquid crystal molecules and the last layer of liquid crystal molecules of the chiral-quarter-wave compensation film 112 be set as 75°. As indicated in FIG. 3A, for the light L1 with wavelengths of 450 nm, 550 nm and 650 nm, the dispersion is near the polar point N1. Thus, it can be concluded that the wideband compensation stacked layer 110 of the embodiments of the present disclosure is a compensation stacked layer capable of converting the light within a wideband (such as within a range of 400 nm to 800 nm) into a circularly polarized light.

The compensation stacked layer of the first comparison example is obtained by swapping the angle difference between the first layer of liquid crystal molecules and the last layer of liquid crystal molecules of the chiral-half-wave compensation film 111 of the wideband compensation stacked layer 110 with the angle difference between the first layer of liquid crystal molecules and the last layer of liquid crystal molecules of the chiral-quarter-wave compensation film 112 of the wideband compensation stacked layer 110. As indicated in FIG. 3B, the circularly polarized light generated by the compensation stacked layer of the first comparison example has a dispersion farther away from the polar point N1. The compensation stacked layer of the second comparison example is obtained by setting the angle difference between the first layer of liquid crystal molecules and the last layer of liquid crystal molecules of the chiral-half-wave compensation film 111 of the wideband compensation stacked layer 110 the same as the angle difference between the first layer of liquid crystal molecules and the last layer of liquid crystal molecules of the chiral-quarter-wave compensation film 112 of the wideband compensation stacked layer 110. For example, both angle differences are set as 24°. As indicated in FIG. 3C, the circularly polarized light generated by the compensation stacked layer of the second comparison example also has a dispersion farther away from the polar point N1.

As indicated in Table 1, each of groups 1 to 23 denotes the retardation value and individual equivalent optical axis of the chiral-half-wave compensation film 111 (for an incident light L1 with a wavelength of 550 nm), the retardation value and individual equivalent optical axis of the chiral-quarter-wave compensation film 112 (for an incident light L1 with a wavelength of 550 nm), and the wavelength dispersion of the wideband compensation stacked layer 110. The Re($\lambda$) of Table 1 denotes the retardation value of the light with a wavelength of A. For example, Re(550) denotes the retardation value of the light with a wavelength of 550 nm. In the wavelength dispersion column of Table 1, the ratio Re(450)/Re(550) and the ratio Re(550)/Re(650) are not larger than 1, this indicates that the slope of the retardation value has a positive trend within the wavelength range. That is, within the wavelength range, the change in the retardation value shows an inverse wavelength dispersion and possesses the feature of wideband retardation value. As indicated in Table 1, although some ratios of Re(450)/Re(550) are larger than 1, the errors are still within an acceptable range. Therefore, the ratios still can be regarded as being equivalent to 1, and the retardation value still possesses the feature of wavelength dispersion.

TABLE 1

| | Chiral-Half-Wave Compensation Film 111 | | Chiral-Quarter-Wave Compensation Film 112 | | Wavelength Dispersion | | Mode 1: Inverse dispersion Mode 2: Normal mode |
|---|---|---|---|---|---|---|---|
| Group | Retardation value (Re(550)), nm | Equivalent optical axis | Retardation value (Re(550)), nm | Equivalent optical axis | Re(450)/ Re(550) | Re(550)/ Re(650) | |
| 1 | 247 | 7.4 | 97.0 | 36.0 | 0.77 | 0.97 | 1 |
| 2 | 249 | 11.0 | 98.0 | 38.0 | 0.69 | 0.93 | 1 |
| 3 | 240 | 16.0 | 77.0 | 40.0 | 0.78 | 0.98 | 1 |
| 4 | 238 | 7.7 | 118.0 | 35.9 | 0.95 | 0.92 | 1 |
| 5 | 257 | 9.5 | 118.0 | 35.9 | 0.88 | 1.04 | 1 |
| 6 | 239 | 10.5 | 110.0 | 37.5 | 1.00 | 0.90 | 1 |
| 7 | 245 | 10.4 | 110.0 | 37.5 | 1.05 | 0.92 | 1 |
| 8 | 248 | 15.7 | 89.0 | 40.0 | 0.99 | 0.93 | 1 |
| 9 | 252 | 15.8 | 89.0 | 40.0 | 1.01 | 0.93 | 1 |
| 10 | 255 | 15.7 | 89.1 | 39.6 | 1.01 | 0.94 | 1 |
| 11 | 239 | 14.0 | 88.0 | 32.0 | 1.01 | 0.92 | 1 |
| 12 | 251 | 14.6 | 101.0 | 39.9 | 1.04 | 0.95 | 1 |
| 13 | 252 | 14.1 | 80.4 | 39.3 | 0.99 | 0.95 | 1 |
| 14 | 245 | 15.2 | 98.2 | 39.0 | 1.01 | 0.93 | 1 |
| 15 | 268 | 13.0 | 92.5 | 38.0 | 0.50 | 0.94 | 1 |
| 16 | 264 | 11.1 | 98.4 | 38.5 | 0.72 | 0.95 | 1 |
| 17 | 255 | 10.7 | 98.4 | 38.5 | 1.00 | 0.95 | 1 |
| 18 | 239 | 10.9 | 98.4 | 38.5 | 1.02 | 0.93 | 1 |
| 19 | 262 | 10.0 | 101.0 | 38.7 | 0.98 | 0.95 | 1 |
| 20 | 255 | 9.3 | 101.0 | 38.5 | 1.01 | 0.94 | 1 |
| 21 | 246 | 9.4 | 101.0 | 37.7 | 1.00 | 0.95 | 1 |
| 22 | 268 | 9.7 | 100.0 | 37.9 | 0.98 | 0.97 | 1 |
| 23 | 288 | 11.0 | 100.0 | 37.9 | 0.91 | 0.96 | 1 |

Furthermore, the retardation value, equivalent optical axis and wavelength dispersion of the Table 1 are measured using AxoScan MMP made by the Axometrics, Inc. of USA.

The optical values of the wideband compensation stacked layer 110 of the embodiments of the present disclosure combined with the linear polarizing film 120 are listed in Table 2. The retardation value of stacked layer and the optical axis of stacked layer are measured for an incident light with a wavelength of 550 nm, wherein the optical axis of stacked layer is an angle with respect to the optical axis of a polarizing film.

TABLE 2

| Group | Retardation value of stacked layer (nm) | Optical axis of stacked layer (°) |
|---|---|---|
| G1 | 168.10 | 11.0 |
| G2 | 170.80 | 9.3 |
| G3 | 175.90 | 7.7 |
| G4 | 179.50 | 7.3 |
| G5 | 182.70 | 6.0 |
| G6 | 187.60 | 4.6 |
| G7 | 193.00 | 3.9 |
| G8 | 202.00 | 1.5 |
| G9 | 187.50 | 8.0 |
| G10 | 187.50 | −1.3 |
| G11 | 189.50 | 2.8 |
| G12 | 190.42 | 11.5 |
| G13 | 191.00 | 9.0 |
| G14 | 192.90 | 7.7 |
| G15 | 194.00 | 1.5 |
| G16 | 195.20 | 11.4 |
| G17 | 197.00 | 5.0 |
| G18 | 216.21 | 9.6 |
| G19 | 226.53 | 3.3 |
| G20 | 250.66 | 8.6 |

Figure 4:
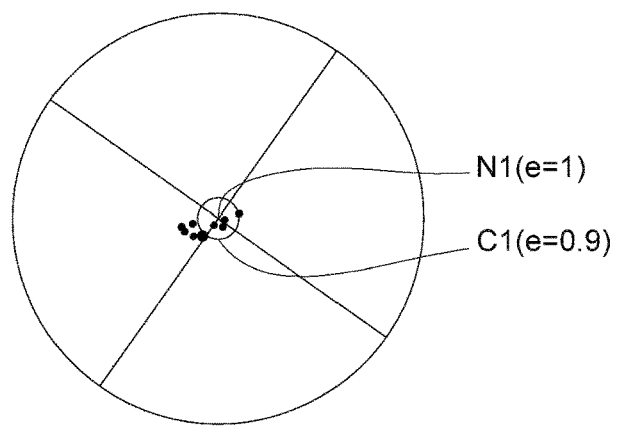
FIGS. 4(1) to 4(20) are graphs showing the circular polarization converting dispersion results of different stacked compensation stacked layers with a linear polarizing film according to the embodiments of the present disclosure.
Figure 4:
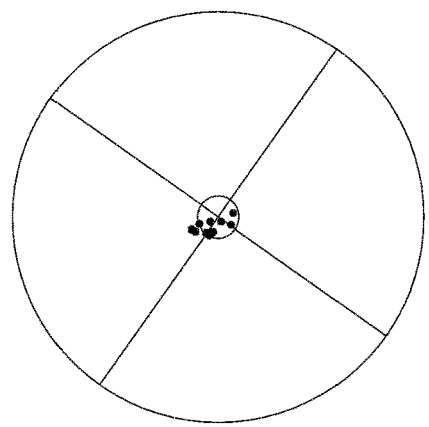
Figure 4:
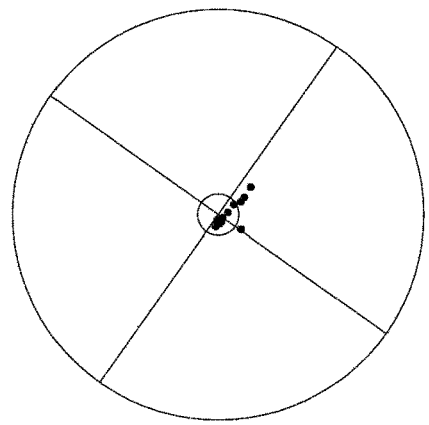
Figure 4:
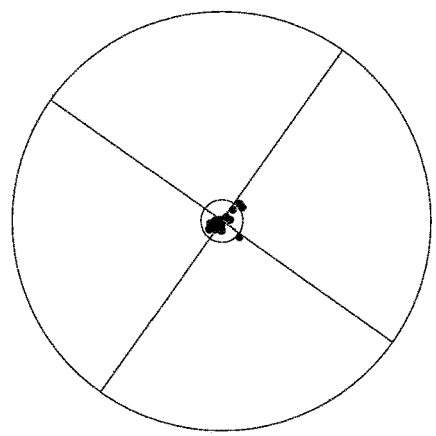
Figure 4:
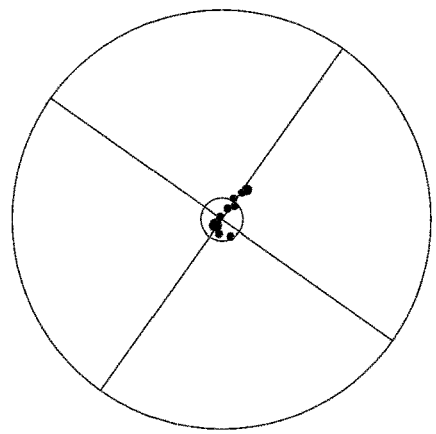
Figure 4:
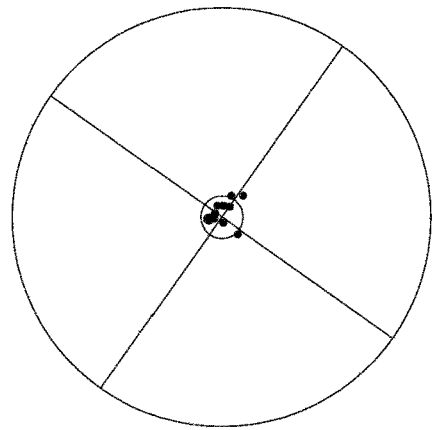
Figure 4:
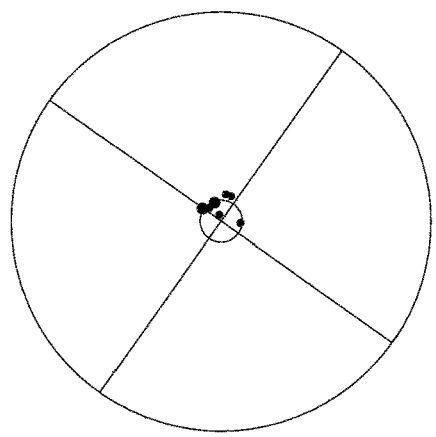
Figure 4:
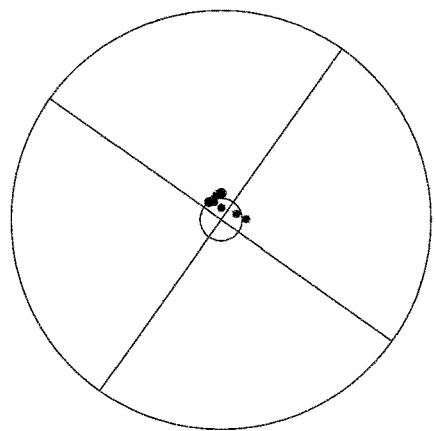
Figure 4:
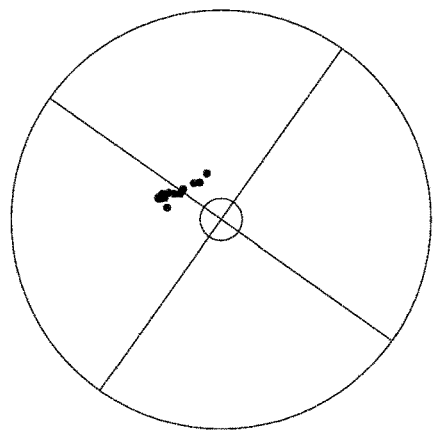
Figure 4:
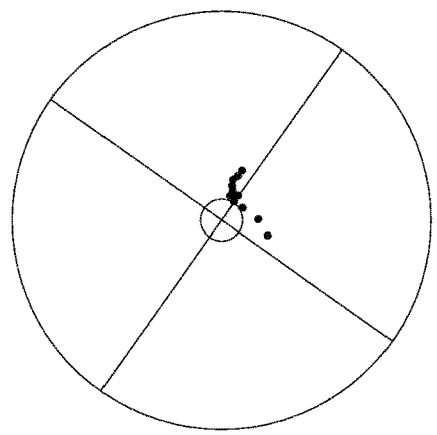
Figure 4:
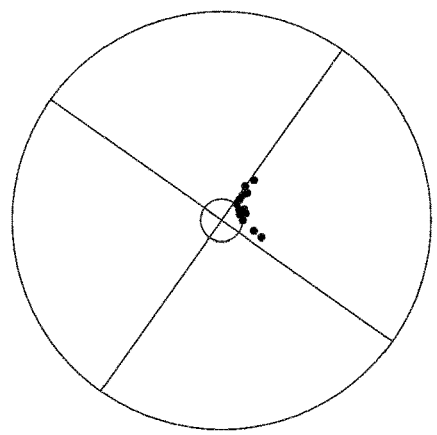
Figure 4:
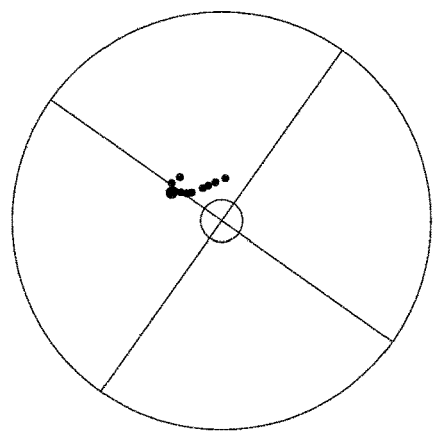
Figure 4:
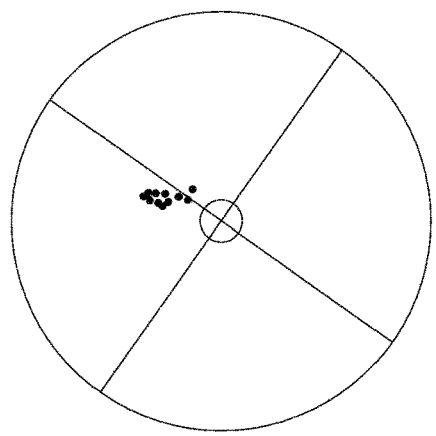
Figure 4:
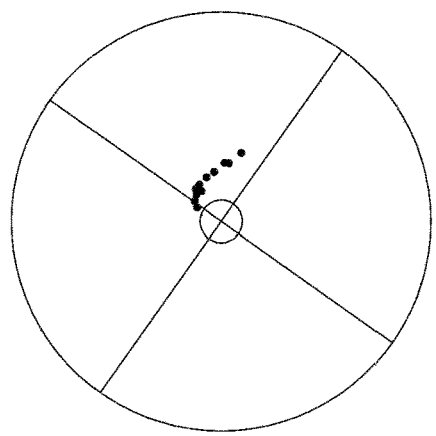
Figure 4:
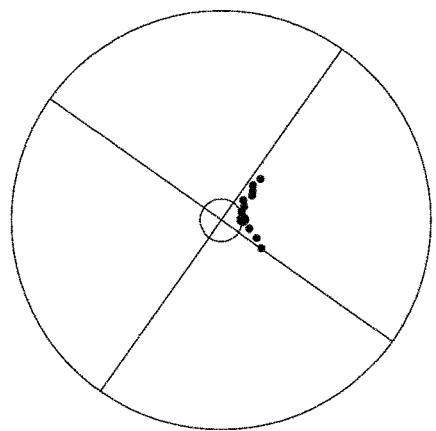
Figure 4:
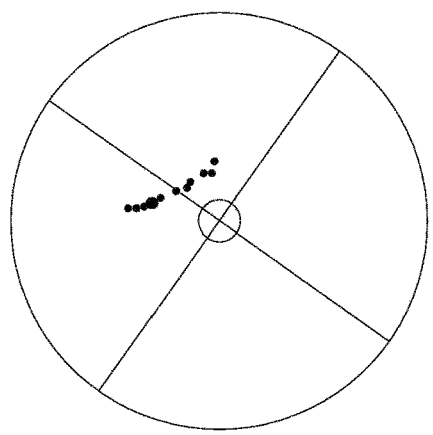
Figure 4:
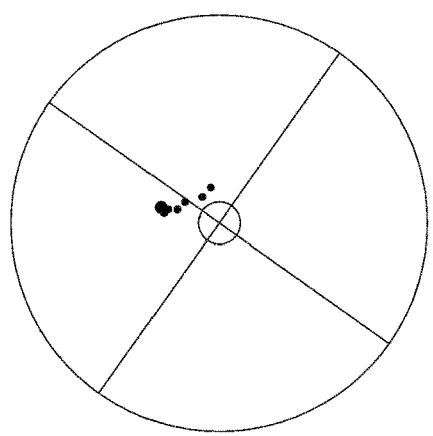
Figure 4:
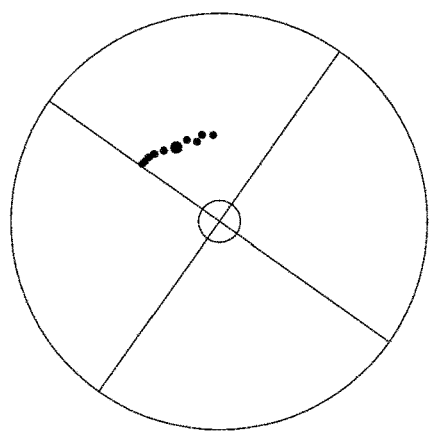
Figure 4:
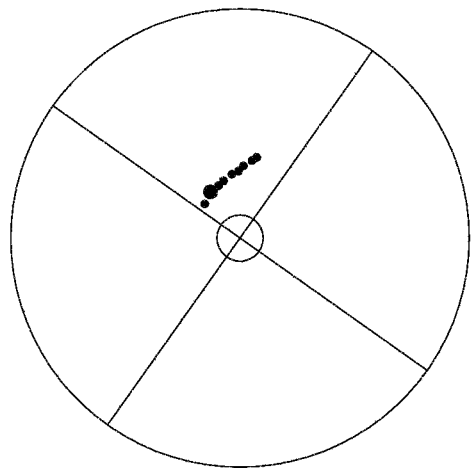
Figure 4:
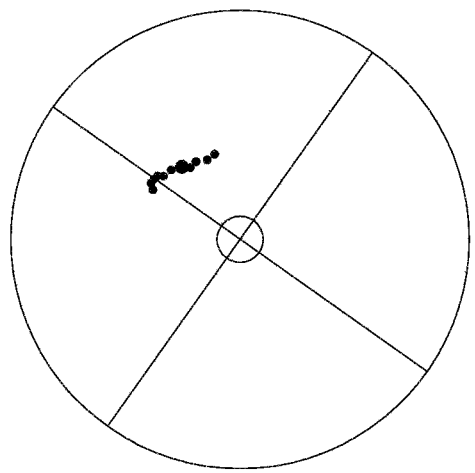

Referring to FIGS. 4(1) to 4(20), measurement results of the dispersion of a circularly polarized light of a wideband compensation stacked layer 110 combined with a linear polarizing film 120 according to the embodiments of the present disclosure are shown. FIGS. 4(1) to 4(20) correspond to groups G1 to G20 of Table 2. The wideband compensation stacked layer 110 includes a chiral-half-wave compensation film 111 and a chiral-quarter-wave compensation film 112. The dispersion of a circularly polarized light is measured using an incident light with a wavelength of 400 nm to 800 nm at an interval of every 25 nm. Each point of FIGS. 4(1) to 4(20) denotes the dispersion of a circularly polarized light measured using an incident light with a wavelength of 400 nm to 800 nm at an interval of 25 nm. Not all points are illustrated because some points may overlap or may be too close to each other. Despite some groups of Table 2 have poor performance in circular polarization conversion (Scenario: 3), they are still within an acceptable range.

As indicated in FIGS. 4(1) to 4(8), the dispersion of each circularly polarized light of groups G1 to G8 of Table 2 is very close to the polar circle C1, which denotes the region with an ellipse rate e of 0.9. In the Poincare sphere model, linear polarization state has an ellipse rate e of 0 (that is, the equator E1), positive circular polarization state has an ellipse rate e of 1 (that is, the polar point N1), the elliptical polarization state has an ellipse rate e within a range of 0 to 1.

Figure 5:
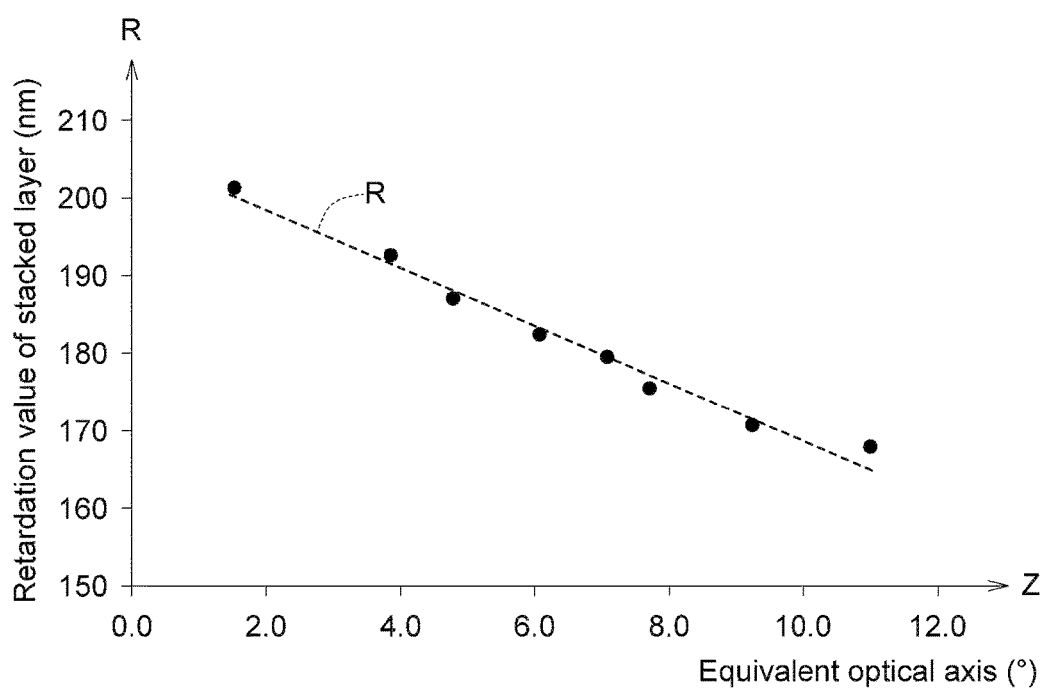
FIG. 5 is a relationship chart of the optical axis and its retardation value of overall stacked layers according to groups G1 to G8 of Table 2.

Referring to FIG. 5, a relationship chart of the optical axis of stacked layer and the retardation value of stacked layer according to groups G1 to G8 of Table 2 is shown. For example, the optical axis of stacked layer and the retardation value of stacked layer of groups G1 to G8 substantially follow a linear relationship: R=aZ+b, wherein R denotes the retardation value of stacked layer; Z denotes the equivalent optical axis of stacked layer with respect to the optical axis of a linear polarizing film. In FIG. 5, the vertical axis denotes the stacked phase (nm); the horizontal axis denotes the equivalent optical axis (°). The coordinates of the multiple points of FIG. 5 are (1.5, 202.0), (3.9, 193.0), (4.6, 187.6), (6.0, 182.7), (7.3, 179.9), (7.7, 175.9), (9.3, 170.8) and (11.0, 168.1)

In other words, as long as the combination of the wideband compensation stacked layer 110 and linear polarizing film 120 of other embodiments of the present disclosure follow the said linear relationship, the wideband compensation stacked layer 110 and linear polarizing film 120 will possess the features of wideband phase compensation. The linear equation can be obtained by a linear fitting method or other mathematical methods.

Figure 6:
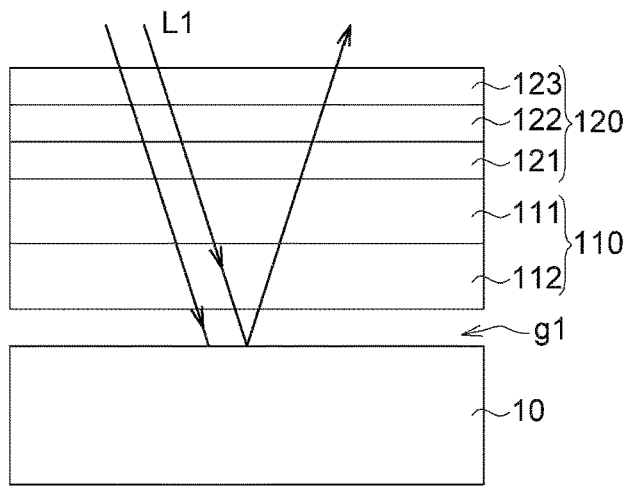
FIG. 6 is a schematic view of the experimental layout for the reflectivity measurement of the wideband compensation stacked layer of FIG. 1.

Referring to FIG. 6, an experimental layout for the reflectivity of the wideband compensation stacked layer 110 of FIG. 1 disposed on a linear polarizing film 120 and a reflector 10 is shown. The wideband compensation stacked layer 110 and the reflector 10 are not adhered by the adhesive layer 130, and therefore a gap (air layer) g1 is formed between the wideband compensation stacked layer 110 and the reflector 10. For example, the linear polarizing film 120 includes a first protection layer 121, a polarization layer 122 and a second protection layer 123, wherein the polarization layer 122 is interposed between the first protection layer 121 and the second protection layer 123. The materials of the first protection layer 121 and the second protection layer 123 include triacetyl cellulose (TAC)

Table 3 lists the results of reflectivity experiment performed to groups 16 to 23 of Table 1. As indicated in Table 3, in comparison to the commercial two-film type compensation film, the wideband compensation stacked layer 110 of the embodiments of the present disclosure has a lower reflectivity. Since the circular polarizer is mainly used for counteracting the reflection of the ambient light, a lower reflectivity indicates a better anti-reflection effect against the ambient light, and a higher contrast.

TABLE 3

| Group | Reflectivity for an incident light with a wavelength of 450 nm (%) | Reflectivity for an incident light with a wavelength of 550 nm (%) | Reflectivity for an incident light with a wavelength of 650 nm (%) |
| --- | --- | --- | --- |
| 16 | 8.98 | 8.05 | 8.06 |
| 17 | 8.78 | 8.04 | 8.01 |
| 18 | 9.15 | 8.16 | 8.37 |
| 19 | 8.77 | 8.03 | 7.71 |
| 20 | 8.85 | 8.05 | 8.13 |
| 21 | 9.01 | 8.08 | 8.22 |
| 22 | 9.16 | 8.26 | 7.89 |
| 23 | 9.17 | 8.25 | 7.57 |
| Commercial products (two-film type) | 9.44 | 8.42 | 8.03 |

The results listed in Table 3 are measured using a commercial two-film type compensation film formed of a half-wave compensation film and a quarter-wave compensation film. The commercial two-film type compensation film produces a compensation effect equivalent to a quarter-wave compensation with circuitous path and allows the dispersion of the circularly polarized light of each color light to be close to the polar region. However, the commercial two-film type compensation film has a disadvantage: individual optical axis and the two compensation films (a half-wave compensation film and a quarter-wave compensation film) need to be precisely aligned through rotation. However, the alignment of compensation films through rotation will definitely produce waste materials. Furthermore, in comparison to the wideband compensation stacked layer 110 of the embodiments of the present disclosure, the commercial two-film type compensation film has a larger thickness and therefore limits the application of flexibility of the organic light-emitting diode.

Figure 7:
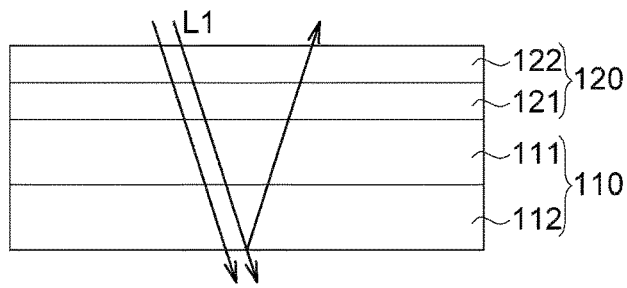
FIG. 7 is a schematic view of the experimental layout for the reflectivity measurement of the wideband compensation stacked layer of FIG. 1.

Referring to FIG. 7, an experimental layout for the reflectivity of the wideband compensation stacked layer 110 of FIG. 1 is shown. The configuration of FIG. 7 is similar to that of FIG. 6 except that the second protection layer 123 is omitted in the linear polarizing film 120 of FIG. 7, and the wideband compensation stacked layer 110 is in contact with the first protection layer 121 of the linear polarizing film 120. For example, the wideband compensation stacked layer 110 and the first protection layer 121 are adhered by an adhesive layer (not illustrated).

Table 4 lists the results of reflectivity experiment performed to group 17 of Table 1. As indicated in Table 4, in comparison to the commercial two-film type compensation film, the wideband compensation stacked layer 110 of the embodiments of the present disclosure has a lower reflectivity.

TABLE 4

| Group | Reflectivity for an incident light with a wavelength of 450 nm (%) | Reflectivity for an incident light with a wavelength of 550 nm (%) | Reflectivity for an incident light with a wavelength of 650 nm (%) |
| --- | --- | --- | --- |
| 17 | 4.07 | 3.91 | 3.96 |
| Commercial products (two-film type) | 5.45 | 4.83 | 4.94 |

Although the optical element 100 of above embodiments is exemplified by an organic light-emitting diode display panel, the embodiments of the present disclosure are not limited thereto. The structures of the wideband compensation stacked layer 110 and other optical element are described below with examples.

Figure 8:
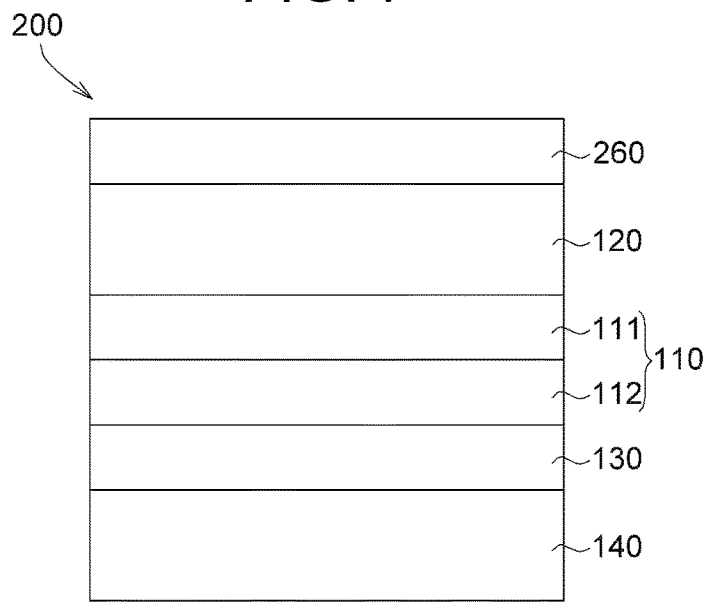
FIG. 8 is a cross-sectional view of an optical element according to another embodiment of the present disclosure.

Referring to FIG. 8, a cross-sectional view of an optical element 200 according to another embodiment of the present disclosure is shown. The optical element 200 includes a function layer 140, an adhesive layer 130, a wideband compensation stacked layer 110, a linear polarizing film 120 and a scratch-resistant layer 260 arranged in a bottom-up order. The structure of the optical element 200 is similar to that of the optical element 100 except that the optical element 200 further includes the scratch-resistant layer 260 for covering and protecting the linear polarizing film 120.

Figure 9:
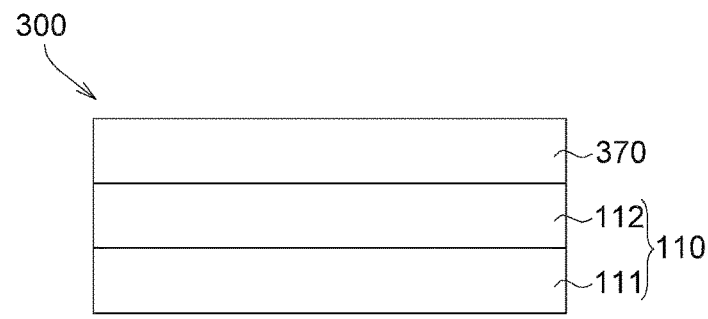
FIG. 9 is a cross-sectional view of an optical element according to another embodiment of the present disclosure.

Referring to FIG. 9, a cross-sectional view of an optical element 300 according to another embodiment of the present disclosure is shown. The optical element 300 includes a wideband compensation stacked layer 110 and a function layer 370 disposed on the wideband compensation stacked layer 110. The chiral-quarter-wave compensation film 112 is interposed between the chiral-half-wave compensation film 111 and the function layer 370. In the present embodiment, the function layer 370 can be realized by a touch layer.

Figure 10:
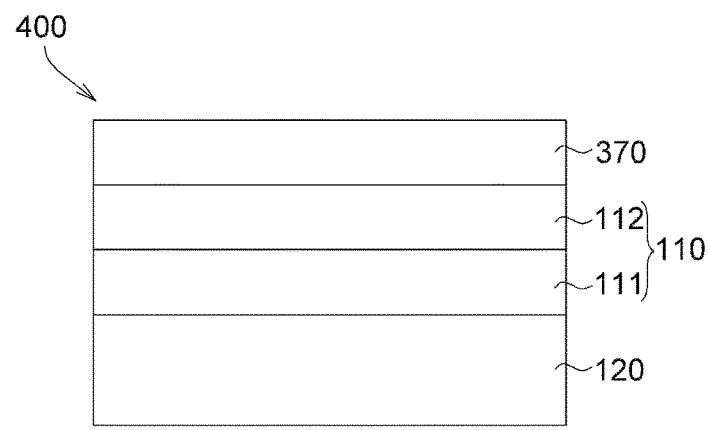
FIG. 10 is a cross-sectional view of an optical element according to another embodiment of the present disclosure.

Referring to FIG. 10, a cross-sectional view of an optical element 400 according to another embodiment of the present disclosure is shown. The optical element 400 includes a wideband compensation stacked layer 110, a linear polarizing film 120 and a function layer 370. The wideband compensation stacked layer 110 is interposed between the linear polarizing film 120 and the function layer 370; the chiral-quarter-wave compensation film 112 is interposed between the chiral-half-wave compensation film 111 and the function layer 370.

Figure 11:
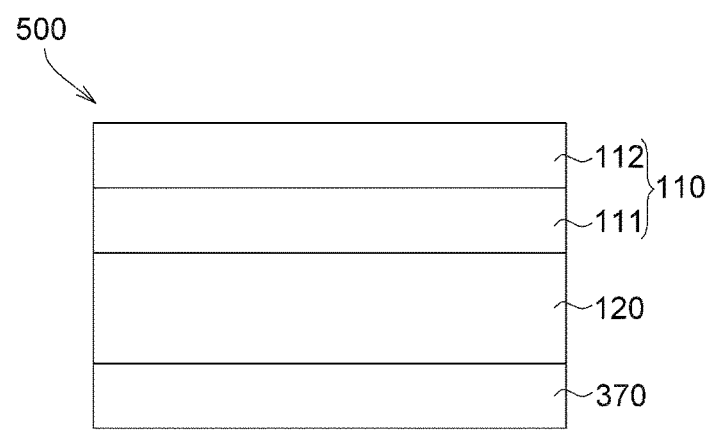
FIG. 11 is a cross-sectional view of an optical element according to another embodiment of the present disclosure.

Referring to FIG. 11, a cross-sectional view of an optical element 500 according to another embodiment of the present disclosure is shown. The optical element 500 includes a wideband compensation stacked layer 110, a linear polarizing film 120 and a function layer 370. The linear polarizing film 120 is interposed between the wideband compensation stacked layer 110 and the function layer 370; the chiral-half-wave compensation film 111 is interposed between the chiral-quarter-wave compensation film 112 and the linear polarizing film 120.

Figure 12:
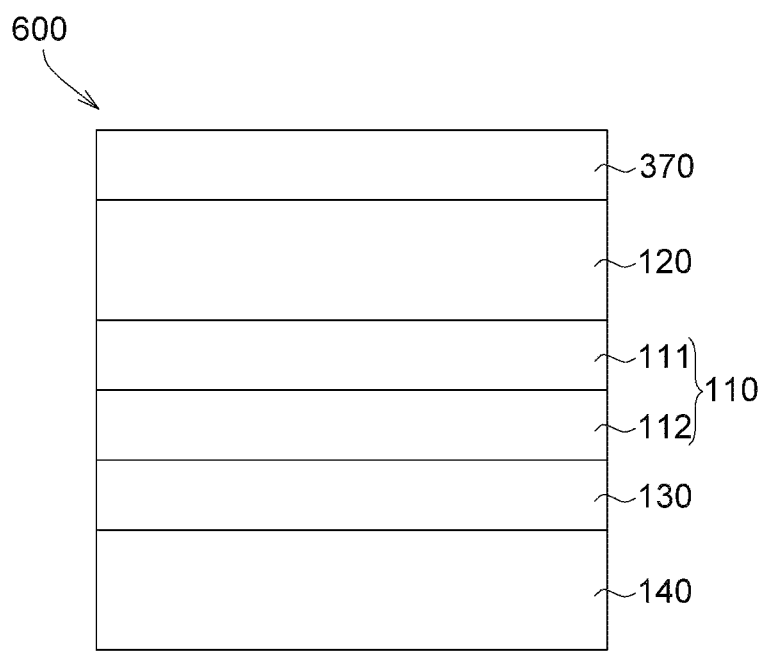
FIG. 12 is a cross-sectional view of an optical element according to another embodiment of the present disclosure.

Referring to FIG. 12, a cross-sectional view of an optical element 600 according to another embodiment of the present disclosure is shown. The optical element 600 includes a function layer 140, an adhesive layer 130, a wideband compensation stacked layer 110, a linear polarizing film 120 and a function layer 370 arranged in a bottom-up order. The chiral-half-wave compensation film 111 is interposed between the chiral-quarter-wave compensation film 112 and the linear polarizing film 120.

Figure 13:
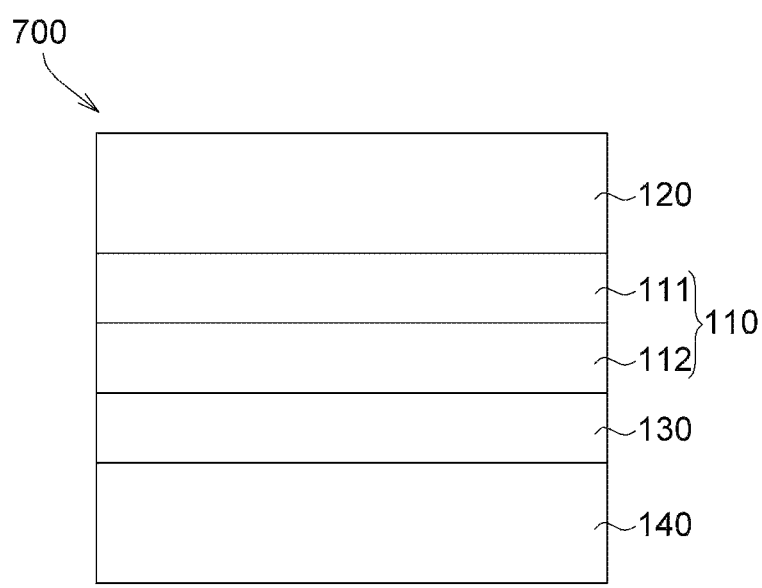
FIG. 13 is a cross-sectional view of an optical element according to another embodiment of the present disclosure.

Referring to FIG. 13, a cross-sectional view of an optical element 700 according to another embodiment of the present disclosure is shown. The optical package 700 includes a function layer 140, an adhesive layer 130, a wideband compensation stacked layer 110 and a linear polarizing film 120 arranged in a bottom-up order. The chiral-half-wave compensation film 111 is interposed between the chiral-quarter-wave compensation film 112 and the linear polarizing film 120.

As disclosed above, the wideband compensation stacked layer 110 of the embodiments of the present disclosure is formed of chiral liquid crystal material, and can be directly coated on a substrate. The substrate can be formed of glass, polyvinyl alcohol (PVA), triacetyl cellulose (TAC), polyethylene terephthalate (PET), acrylonitrile, polyimide, polyvinylidene fluoride (PVDF), polycarbonate (PC), and polyethylene naphthalate (PEN), and can be used as an inverse dispersion compensation film. Besides, the wideband compensation stacked layer 110 can also be directly coated on the linear polarizing film 120 and used as a wideband circular polarizer. Examples of the linear polarizing film include film-type guest-host polarizer, wire-grid polarizer, and conventional iodine or dye polarizer. The TAC film between the conventional iodine or dye linear polarizer and the wideband compensation stacked layer 110 of the embodiments of the present disclosure can be peeled off to reduce element thickness. In another embodiment, the wideband compensation stacked layer 110 originally coated on the substrate can be transferred on the linear polarizing film, and the substrate can choose to keep the wideband compensation stacked layer 110 or have it be peeled off.

In a preparation method of the chiral-half-wave compensation film 111, the chiral material provides continuous twist to the liquid crystal molecules originally arranged in single optical axis. The preparation method of the liquid crystal molecules includes: dissolving the BASF polymeric nematic liquid crystal LC 242 (such as 2 g) and the BASF dextrorotatory compound LC-756 (such as relative polymeric nematic liquid crystal within a range of 0.034% to 0.066%) in a 4:1 mixed solvent of toluene and cyclohexanone (such as 6 g)

In a preparation method of the chiral-quarter-wave compensation film 112, the chiral material provides continuous twist to the liquid crystal molecules originally arranged in single optical axis. The preparation method of the liquid crystal molecules includes: dissolving the BASF polymeric nematic liquid crystal LC 242 (such as 2 g) and BASF dextrorotatory compound LC-756 (such as relative polymeric nematic liquid crystal within a range of 0.27% to 0.45%) in a 4:1 mixed solvent of toluene and cyclohexanone (such as 8 g).

In a manufacturing method of the wideband compensation stacked layer 110, the chiral-half-wave compensation film 111 is coated on a TAC substrate having completed mechanical rubbing alignment with a rubbing direction of 90°. After the chiral-half-wave compensation film 111 is processed with exposure and directional solidification, the chiral-quarter-wave compensation film 112 is coated on the chiral-half-wave compensation film 111, and again is processed with exposure and directional solidification.

To summarize, the wideband compensation stacked layer of the embodiments of the present disclosure is capable of converting an incident light within a wideband range (for example, 400 nm to 800 nm) into a positive circularly polarized light or near a circularly polarized light, and therefore has at least one of the following technical effects: (1) Increasing the contrast of the optical element such as display panel, touch panel, and touch display panel; (2) Reducing the leakage of the light entering the display panel, such that the display frame is all black or near black, and will not be bluish; (3) Increasing ambient light rejection for the display panel (such as the organic light-emitting diode display panel). Additionally, the chiral-half-wave compensation film and the chiral-quarter-wave compensation film of the wideband compensation stacked layer of the embodiments of the present disclosure are formed by using a film technology without an alignment step, and therefore are free of the rotary alignment problem and the waste material problem resulting from the use of the two-film type compensation film. Moreover, the chiral-half-wave compensation film and the chiral-quarter-wave compensation film of the wideband compensation stacked layer of the embodiments of the present disclosure are formed by using a film technology, and therefore have a small thickness, which benefits the application of flexibility of the optical element using the same.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wideband compensation stacked layer, comprising:
a chiral-half-wave compensation film; and
a chiral-quarter-wave compensation film;
wherein the chiral-quarter-wave compensation film is directly in contact with the chiral half-wave compensation film through a first contact surface; along the first contact surface, the first layer of liquid crystal molecules of the chiral-quarter-wave compensation film is arranged in line with the last layer of liquid crystal molecules of the chiral-half-wave compensation film; a retardation value R of the wideband compensation stacked layer and an equivalent optical axis Z of the wideband compensation stacked layer with respect to an optical axis of a linear polarizing film follow a linear relationship: R=aZ+b, wherein a and b are constant coefficients.

2. The wideband compensation stacked layer according to claim 1, wherein before a first chiral material is added to the chiral-half-wave compensation film, the chiral-half-wave compensation film generates an original retardation value within a range of 225 nanometers (nm) to 325 nm for an incident light with a wavelength of 550 nm.

3. The wideband compensation stacked layer according to claim 1, wherein the chiral-half-wave compensation film comprises a first chiral material, and the first chiral material makes the angle difference between the first layer of liquid crystal molecules and the last layer of liquid crystal molecules of the chiral-half-wave compensation film fall within a range of 15° to 35°.

4. The wideband compensation stacked layer according to claim 1, wherein the chiral-half-wave compensation film comprises a first chiral material, and the first chiral material makes individual equivalent optical axis of the chiral-half-wave compensation film form an angle within a range of 5° to 30° with respect to the optical axis of the linear polarizing film.

5. The wideband compensation stacked layer according to claim 1, wherein the chiral-half-wave compensation film further comprises a first chiral material, and the first chiral material makes the retardation value of the chiral-half-wave compensation film within a range of 230 nm to 270 nm.

6. The wideband compensation stacked layer according to claim 1, wherein before a second chiral material is added to the chiral-quarter-wave compensation film, the chiral-quarter-wave compensation film generates an original retardation value within a range of 112 nm to 163 nm for an incident light with a wavelength of 550 nm.

7. The wideband compensation stacked layer according to claim 1, wherein the chiral-quarter-wave compensation film comprises a second chiral material, and the second chiral material makes the angle difference between the first layer of liquid crystal molecules and the last layer of liquid crystal molecules of the chiral-quarter-wave compensation film fall within a range of 70° to 95°.

8. The wideband compensation stacked layer according to claim 1, wherein the chiral-quarter-wave compensation film comprises a second chiral material, and the second chiral material makes individual equivalent optical axis of the chiral-quarter-wave compensation film form an angle within a range of 25° to 50° with respect to the optical axis of the linear polarizing film.

9. The wideband compensation stacked layer according to claim 1, wherein the chiral-quarter-wave compensation film comprises a second chiral material, and the second chiral material makes the retardation value of the second liquid crystal molecule of the chiral-quarter-wave compensation film within a range of 75 nm to 110 nm.

10. The wideband compensation stacked layer according to claim 1, wherein the chiral-half-wave compensation film is in contact with the linear polarizing film through a second contact surface; the chiral-half-wave compensation film is interposed between the linear polarizer and the chiral-quarter-wave compensation film; along the second contact surface, the first layer of liquid crystal molecules of the chiral-half-wave compensation film is arranged in line with the optical axis of the linear polarizing film, and no off-axis angle is formed.

11. An optical element, comprising:
    a wideband compensation stacked layer according to claim 1;
    a function layer; and
    an adhesive layer interposed between the chiral-quarter-wave compensation film of the wideband compensation stacked layer and the function layer for adhering the chiral-quarter-wave compensation film to the function layer.

12. The optical element according to claim 11, wherein the function layer is an organic light-emitting diode layer.

13. The optical element according to claim 11, wherein the function layer is a touch layer.

* * * * *